(12) United States Patent
Bunker et al.

(10) Patent No.: US 6,896,987 B2
(45) Date of Patent: May 24, 2005

(54) FUEL CELL CONTAINER COOLING SYSTEM

(75) Inventors: Ronald Scott Bunker, Niskayuna, NY (US); Chellappa Balan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 10/305,162

(22) Filed: Nov. 27, 2002

(65) Prior Publication Data

US 2004/0101726 A1 May 27, 2004

(51) Int. Cl.$^7$ ............................. H01M 8/02; H01M 8/04
(52) U.S. Cl. ............................. 429/26; 429/34; 429/38; 429/39; 429/30
(58) Field of Search ..................... 429/26, 34, 30, 429/38, 35

(56) References Cited

U.S. PATENT DOCUMENTS

| | | | | |
|---|---|---|---|---|
| 5,750,278 A | * | 5/1998 | Gillett et al. | 429/24 |
| 5,952,116 A | | 9/1999 | Blum et al. | |
| 2003/0054215 A1 | * | 3/2003 | Doshi et al. | 429/26 |
| 2004/0023089 A1 | * | 2/2004 | Schiegl | 429/26 |

* cited by examiner

Primary Examiner—Patrick Joseph Ryan
Assistant Examiner—Angela J. Martin
(74) Attorney, Agent, or Firm—Fletcher Yoder

(57) ABSTRACT

A fuel cell assembly comprises a container, configured to be pressurized. A fuel cell is disposed in the container and a thermal shield substantially surrounds an inner periphery of the container to provide generally uniform thermal shielding around the fuel cell. The thermal shield is disposed between the container and the fuel cell and is spaced from the container to form a flow path therebetween for a cooling fluid.

46 Claims, 6 Drawing Sheets

FUEL CELL CONTAINER COOLING SYSTEM

BACKGROUND OF INVENTION

The present invention relates generally to power generation equipment such as fuel cell assemblies, and particularly to thermal management of fuel cell assemblies, such as solid oxide fuel cell assemblies.

Thermal energy is generated in a fuel cell from the reaction of a fuel and an oxidant. Fuel cells, such as solid oxide fuel cells operate at a temperature typically between about 600° C. to about 1300° C. Such fuel cells, typically used in power generation applications, are disposed within a pressurized container. However, maintaining structural integrity of such container poses challenges, particularly as it is desirable to fabricate the container from available materials which are relatively inexpensive but that can nevertheless withstand the specified temperature range during operation.

A particular challenge in thermal management of fuel cells is to maintain a certain maximum temperature, or lower, of the container. Another difficulty resides in maintaining fairly uniform thermal gradients in the container, both through the thickness of the container wall and associated structures, and along the container wall (e.g. in lateral directions). Such thermal gradients can generate thermal hot spots at localized regions in the container, and cause structural and material problems, due to differential thermal expansion, for example.

Certain existing fuel cell designs make use of insulation within a part of the container, typically integral with the container wall. Other designs form cooling channels within the container wall itself. However, conventional fuel cell applications that use such integral cooling channels generally cannot maintain an isothermal condition throughout the container, and do not reduce the heating of the container wall. Additionally, removing waste heat flux generated by the fuel cell outside the fuel cell assembly can result in poor thermal performance of the fuel cell assembly. Similarly, partitions or channels of the type used in existing arrangements can actually cause substantial thermal gradients along the container wall, resulting in the type of differential heating that should be avoided.

Accordingly, there is a need in the art for an improved thermal management system for fuel cell assemblies, which can maintain more uniform thermal gradients of the container, reduce the temperature of the container itself, and enhance the desired thermal efficiency of the fuel cell assembly.

BRIEF DESCRIPTION

The present technique is designed to respond to such needs. Briefly, in accordance with one embodiment of the present technique, a fuel cell assembly comprises a container configured to be pressurized. A fuel cell is disposed in the container and a thermal shield substantially surrounds an inner periphery of the container to provide generally uniform thermal shielding around the fuel cell. The thermal shield is disposed between the container and the fuel cell and is spaced from the container to form a flow path therebetween for a cooling fluid.

Another embodiment of the present technique provides a fuel cell assembly comprising a container, which is configured to be pressurized. A fuel cell is disposed in the container and a metallic shield is disposed between the container and the fuel cell. The metallic shield is spaced from the container to form a flow path therebetween for a cooling fluid.

Another embodiment of the present technique provides a fuel cell assembly comprising a container configured to be pressurized. A fuel cell is disposed in the container and a shield substantially surrounds a perimeter of the fuel cell. The shield is disposed between the container and the fuel cell and is spaced from the container to form a flow path therebetween for a cooling fluid.

Another embodiment of the present technique provides a fuel cell assembly comprising a container configured to be pressurized. A fuel cell is disposed in the container and a shield substantially surrounds an inner periphery of the container to provide generally uniform thermal shielding around the fuel cell. The shield is disposed between the container and the fuel cell and spaced from the container to form a flow path therebetween for a cooling fluid.

Another embodiment of the present technique provides a fuel cell assembly comprising a pressurized container. A fuel cell is disposed in the container; and a thermally conductive shield is disposed between the container and the fuel cell and spaced from the container to form a flow path therebetween for a cooling fluid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Fuel cells, such as solid oxide fuel cells, have demonstrated a potential for high efficiency and low pollution in power generation. In general, a fuel cell is an energy conversion device that produces electricity, by electrochemically combining a fuel and an oxidant across an ionic conducting layer. Fuel cells may be stacked together either in series or in parallel to construct the fuel cell architecture, capable of producing a resultant electrical energy output. In an exemplary embodiment illustrated in FIG. 1, an exemplary fuel cell assembly 10, such as a solid oxide fuel cell assembly, comprises a fuel cell 12 (which may be referred to as a stack or collection of cells or stacks) disposed within a pressurized container 14. A thermal shield 16 is disposed between the fuel cell 12 and the container 14 to provide improved thermal management of heat flux generated by the fuel cell 12 during operation, as discussed in greater detail below.

Figure 2:
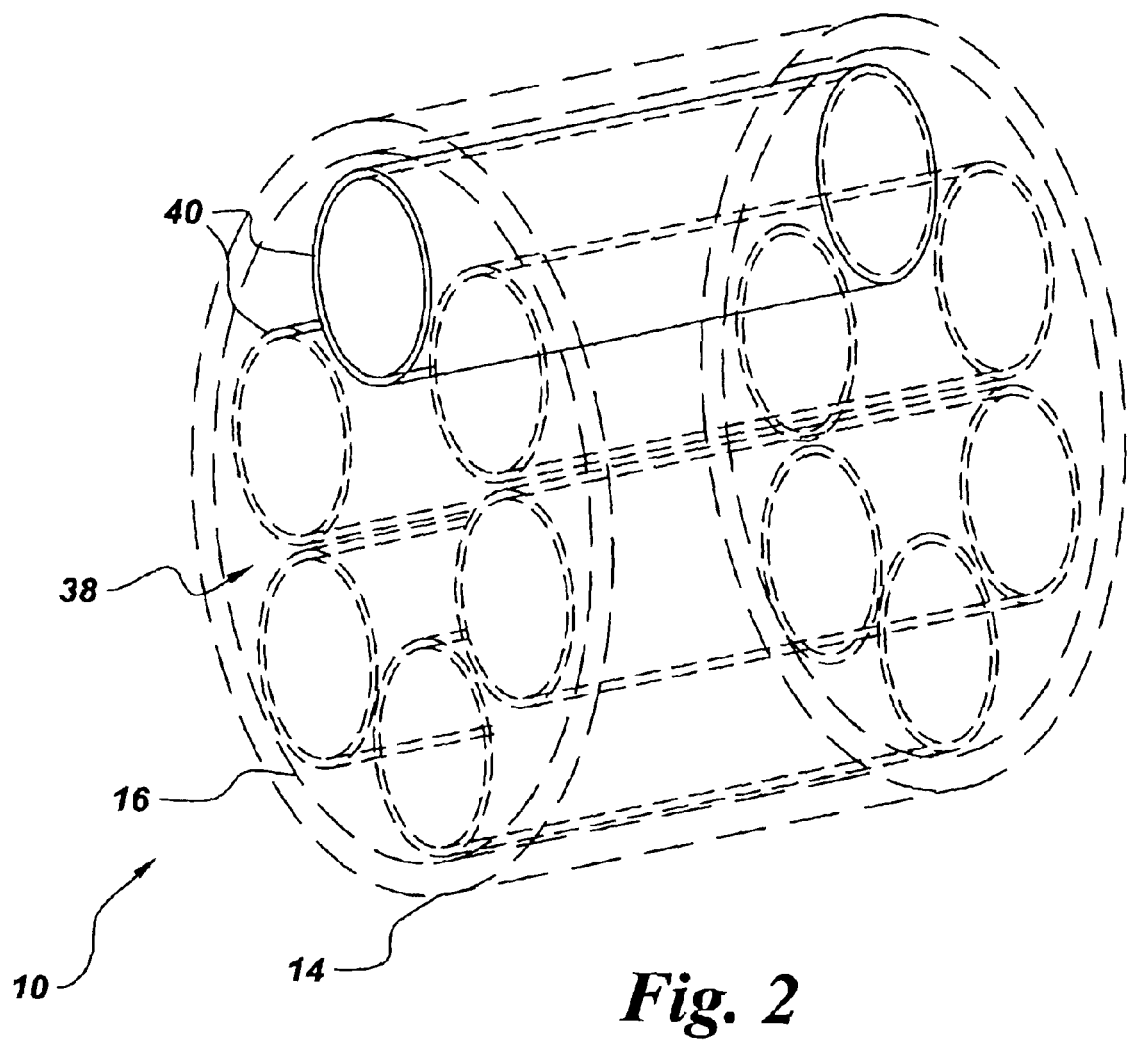
FIG. 2 is a similar diagrammatical perspective view of an exemplary tubular fuel cell assembly incorporating a thermal shield.

In this first exemplary embodiment, the fuel cell 12 comprises a single fuel cell having planar configuration, although multiple such cells may be provided in a single structure. In another exemplary embodiment illustrated in FIG. 2 fuel cell assembly 10 comprises a set 38 of fuel cells. The set 38 of fuel cells comprises fuel cells 40 having tubular configuration. The fuel cells 12, 40 can be any type of fuel cell including, but not limited to, solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

Figure 1:
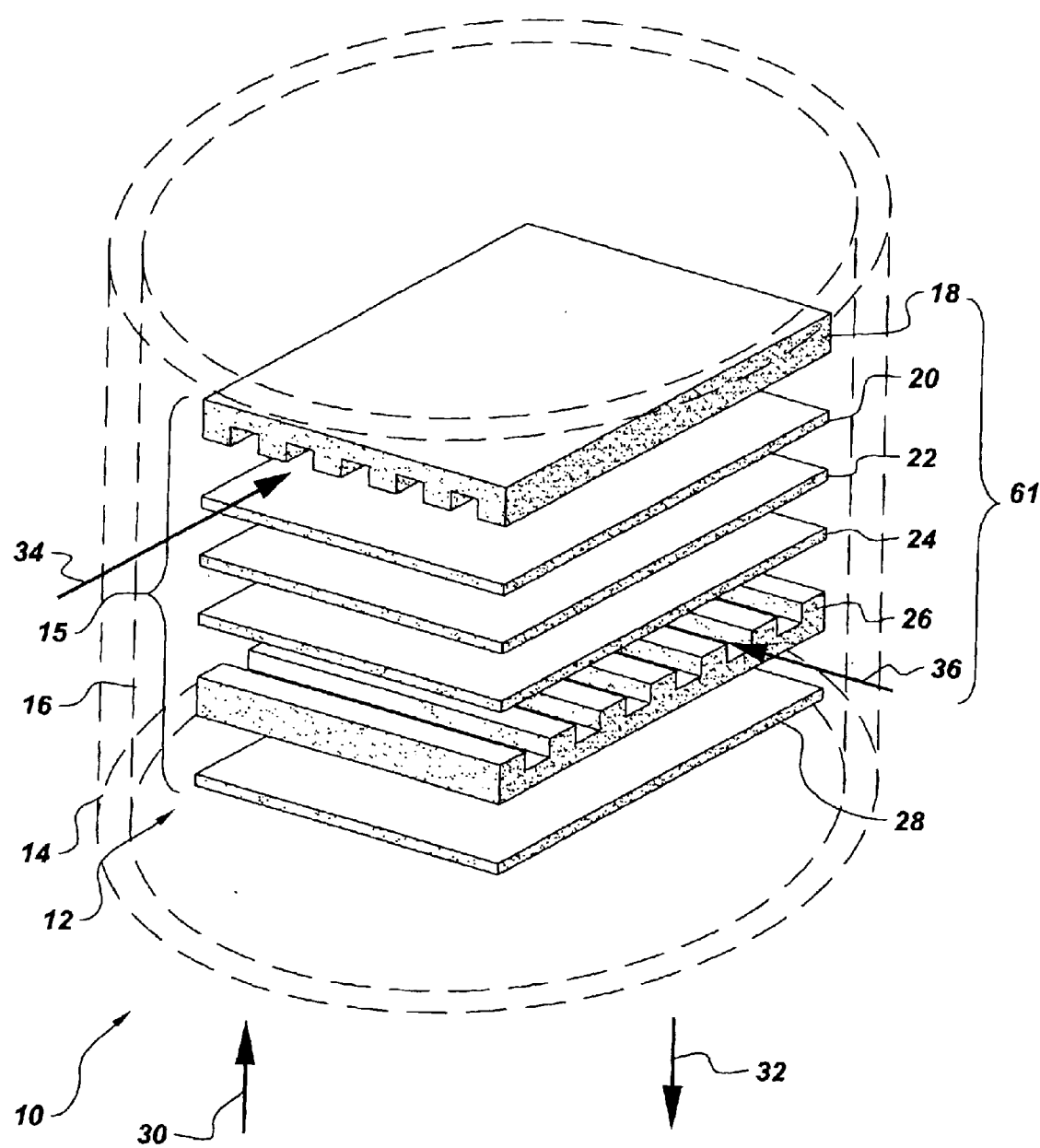
FIG. 1 is a diagrammatical perspective view of an exemplary planar fuel cell assembly having a thermal shield in accordance with one aspect of the present technique.

Referring specifically to the embodiment of FIG. 1, the exemplary fuel cell 12 comprises an anodes 20 and 28, a cathode 24, an electrolyte 22 interposed therebetween, an interconnect 26 which is in intimate contact with at least one of the anode 20, the cathode 24 and the electrolyte 22. As illustrated in FIG. 1, an oxidant, such as air, is introduced into the fuel cell 12 through an oxidant inlet 30, and exits through an exhaust 32. Similarly, a fuel flow is introduced into the assembly, as indicated generally at reference numeral 34. The oxidant flows through a coolant channel defined between the inner wall of the container 14 and the thermal shield 16, and is introduced into the fuel cell 12, as indicated generally at reference numeral 36 to provide oxidant to the cathode 24.

In the exemplary fuel cell 12, such as the solid oxide fuel cell, oxygen ions ($O^{2-}$) generated at the cathode 24 are transported across the electrolyte 22 interposed between the anode 20 and the cathode 24. The fuel 34, for example natural gas, is fed to the anode 20. The fuel 34 at the anode 20 site reacts with oxygen ions ($O^{2-}$) transported to the anode 20 across the electrolyte 22. The oxygen ions ($O^{2-}$) are de-ionized to release electrons to an external electric circuit (not shown). The electron flow thus produces direct current electricity across the external electric circuit. The electricity generation process produces certain exhaust gases and generates waste heat. The exhaust gases are exhausted through outlet 32.

It should be noted that, in practice, the routing of the fuel and oxidant might vary depending upon the fuel cell design and operation. For example, while in the embodiments shown a single exhaust accommodates the oxidant and fuel discharged, these exhaust streams may be separated in certain designs.

It should also be noted that the present technique offers a number of possibilities for at least partially thermally shielding the container wall from heat generated by the fuel cell. In one set of embodiments, for example, one or more flow paths are defined between the container wall and the thermal shield, and a coolant is circulated though the paths to extract heat via convective heat transfer. In a presently contemplated embodiment, the coolant stream comprises at least part of the oxidant needed for operation of the fuel cell. All or part of the coolant may be circulated through the cell, or the coolant stream may be supplemented by additional flow, depending upon such factors as the heat load, the coolant inlet temperature, the mass flow rate of coolant, and the mass flow rate of oxidant. The use of oxidant as coolant also provides the advantage of preheating the oxidant for more efficient reaction within the fuel cell. Alternatively, a separate coolant, including gaseous, liquid or mixed phase coolants, may be employed and isolated from the oxidant stream, as described in greater detail below.

Figure 3:
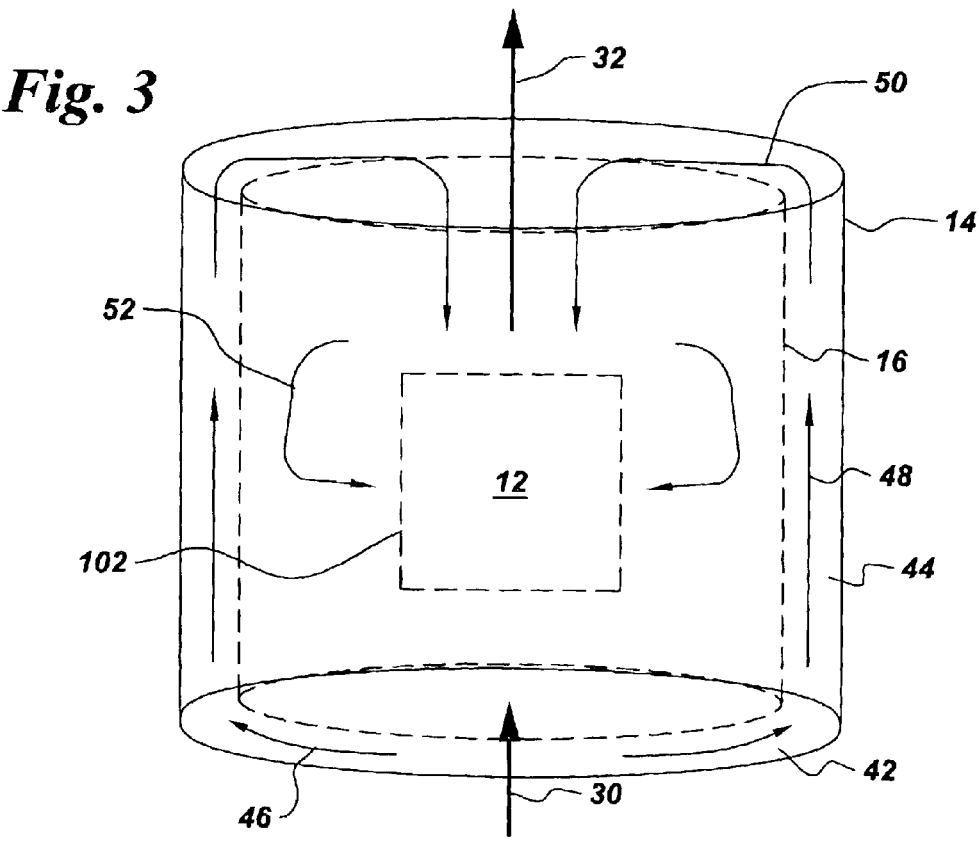
FIG. 3 is a diagrammatical view of a fuel cell assembly illustrating placement of the thermal shield within the assembly container and the flow of coolant within the assembly.
Figure 4:
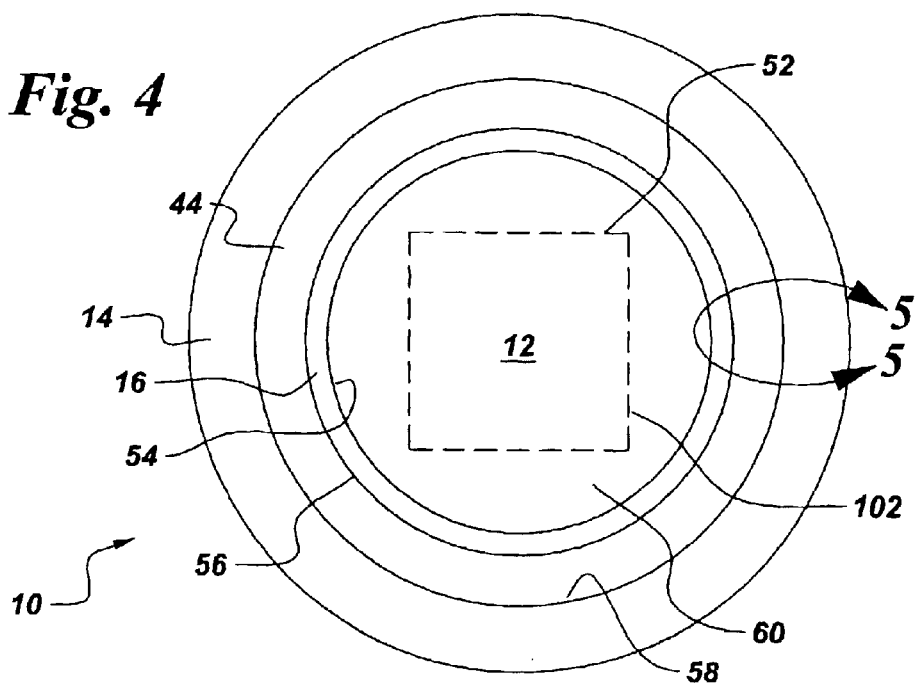
FIG. 4 is diagrammatical a cross sectional view of the fuel cell assembly of FIG. 3 illustrating the placement of the thermal shield within the container.

In an exemplary embodiment, as illustrated in FIG. 3 and FIG. 4, the fuel cell assembly 10 comprises a fuel cell 12 disposed within a container 14 configured to be pressurized, and a thermal shield 16 disposed between the fuel cell 12 and the container 14. Within the container 14, a lower distribution passage 42 is formed to distribute coolant flow 46. The thermal shield 16 is spaced from the fuel cell container 14 to form a peripheral flow path 44 therebetween in fluid communication with the distribution passage 42.

The coolant flow 46, which again in certain embodiments may comprise some or all of the needed oxidant, enters through the oxidant inlet 30 and flows through the lower distribution passage 42. The coolant flow 46 is then distributed in the lower distribution passage and enters a peripheral passage 44, as indicated generally at reference numeral 48. Where the coolant comprises oxidant, preheated by energy extracted from the thermal shield 16 and container 14 wall, at least a portion of the coolant flow 50, 52 is directed into the fuel cell 12, before being exhausted through the outlet 32.

Figure 5:
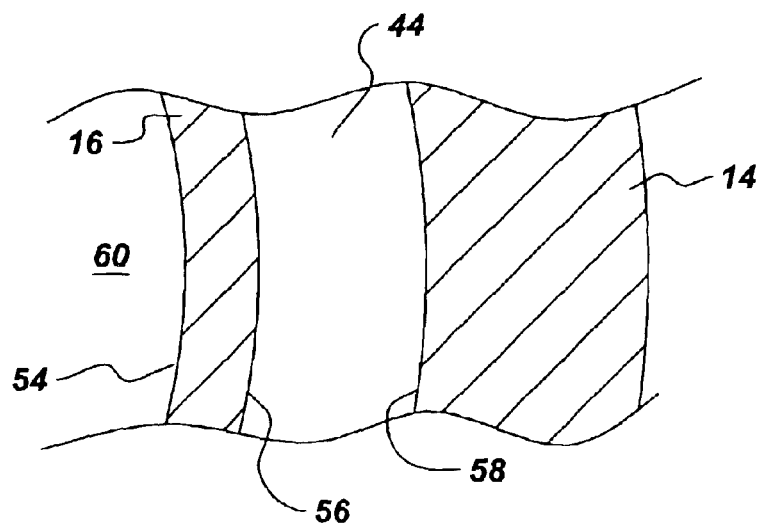
FIG. 5 is a detail sectional view of section 5—5 of FIG. 4 illustrating a first exemplary configuration of the thermal shield.

As shown in FIG. 5, in the illustrated embodiment the thermal shield 16 presents an inner wall 54 disposed generally towards the fuel cell 12 and an outer wall 56 oriented towards the inner wall or periphery 58 of the container 14. In this embodiment, the thermal shield 16 is configured to substantially surround an inner volume 60 within which the fuel cell 12 is disposed, and to similarly contiguously circumscribes the inner wall or periphery 58 of the container 14 to provide for lowering the operating temperature of the container 14 and to provide more uniform heat distribution around the inner periphery 58 of the container 14. As further illustrated in FIG. 5, the peripheral passage or flow path 44 is defined by the thermal shield outer surface 56 and container inner surface 58.

The thermal shield 16 may comprise a thermally conductive material such as a metallic material. The thermal shield 16 and the coolant flow through the flow path 44, maintain temperatures of the fuel cell container 14 at or below prescribed limits. Maintaining temperature of the fuel cell container 14 at or below prescribed limits aids in maintaining structural integrity of the fuel cell container 14, which may be fabricated from conventionally available and economically affordable materials which can nevertheless withstand the operating temperature range, such as between about 600° C. to about 1300° C. In actual implementation, it is anticipated that the container will ideally operate at temperatures well below those of the fuel cell assembly, such as below the 600° C. to 1300° C. temperature range indicated.

Figure 6:
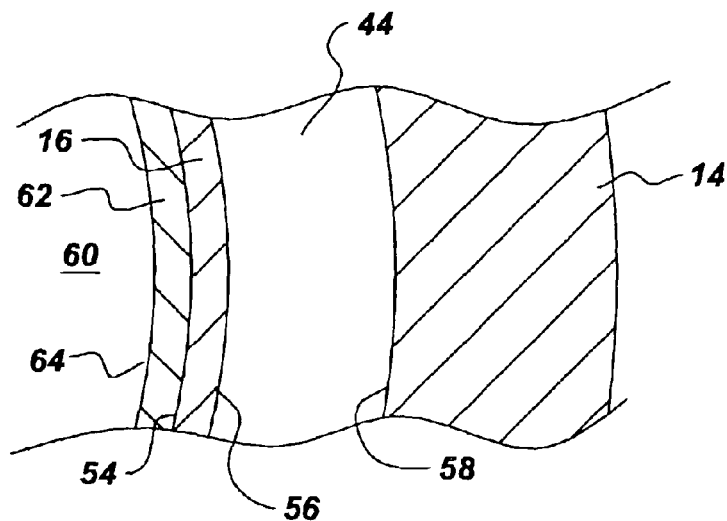
FIG. 6 is a detail sectional view of section 5—5 of FIG. 4 illustrating a second exemplary configuration of the thermal shield.
Figure 7:
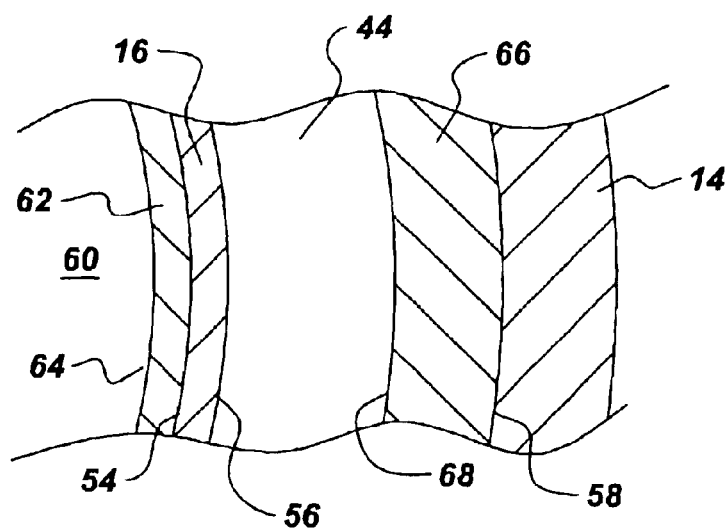
FIG. 7 is a detail sectional view of section 5—5 of FIG. 4 illustrating a third exemplary configuration of the thermal shield.

In an alternative embodiment, illustrated in FIG. 6, the thermal shield 16 includes an insulating layer 62 on the inner surface 54 of the thermal shield 16. In other embodiment, illustrated in FIG. 7, the container 14 has another insulating layer 66 disposed on the inner surface 58 of the container 14. The insulating layers 62 and 66 comprise an insulating material, which may include, but is not limited to, a ceramic coating such as plasma sprayed thermal barrier coating. Such coatings may include, for example, yttria stabilized zirconia oxides, porous or cellular ceramic foam materials, or other ceramics or low thermal conductivity metallic oxides capable of operating at the temperatures anticipated in the fuel cell assembly. The insulating layers 62, 66 maintain a desired thermal gradient through the thermal shield 16 and wall 58 of the container 14 so as to reduce the temperature of the container wall during operation. Moreover, the thermal shield 16 effectively avoids or reduces thermal hot spots at localized regions in the container 14 ensuring uniform structural integrity throughout the container 14 surface.

Figure 8:
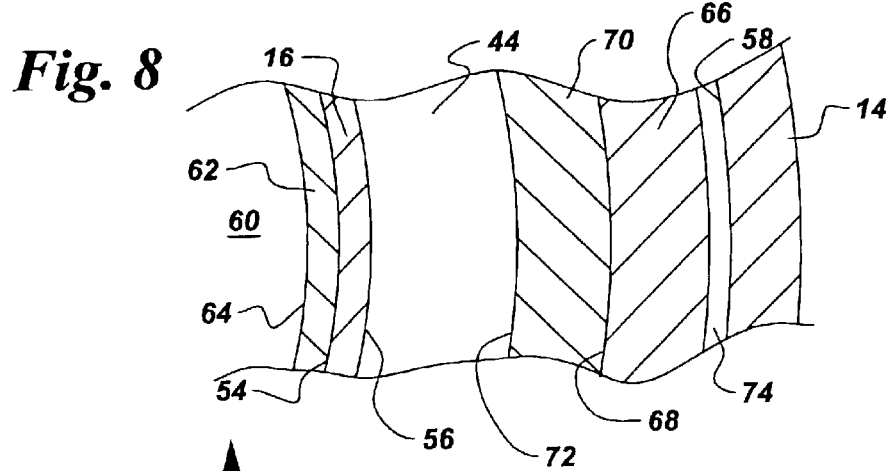
FIG. 8 is a detail sectional view of section 5—5 of FIG. 4 illustrating a fourth exemplary configuration of the thermal shield.

In another embodiment, illustrated in FIG. 8, the thermal shield 16 further comprises a second shield wall 70 configured to define an inner surface 58 of the container 14. In a further embodiment, the insulating layer 66 is disposed between the second shield wall 70 and the inner surface 58 of the container 14. The flow path 44 is defined by the inner surface 72 of the second shield wall 70 and the outer surface 56 of the thermal shield 16. This embodiment permits construction of the thermal shield 16 as a double-walled canister or vessel, which can simply be disposed within the container 14 intermediate the container wall 58 and the fuel cell 12.

Figure 9:
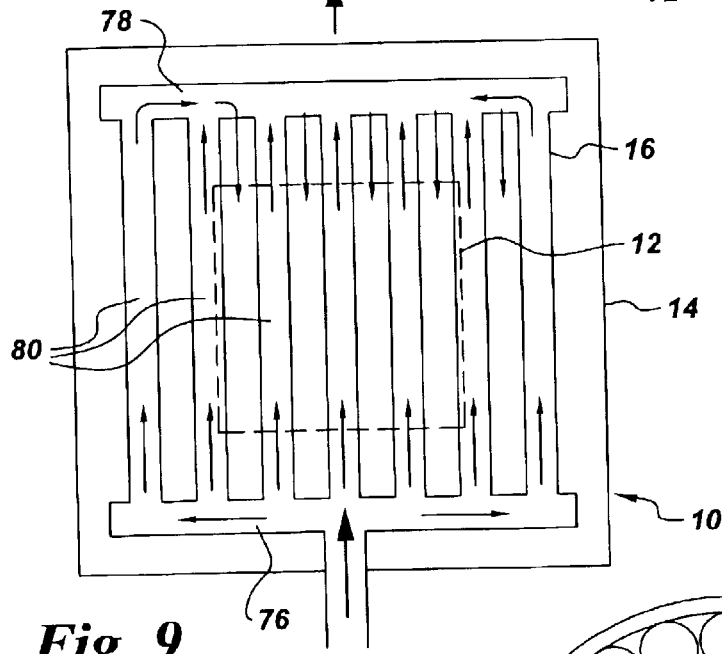
FIG. 9 is a diagrammatical elevation view of a fuel cell assembly incorporating an alternative tubular thermal shield design.
Figure 10:
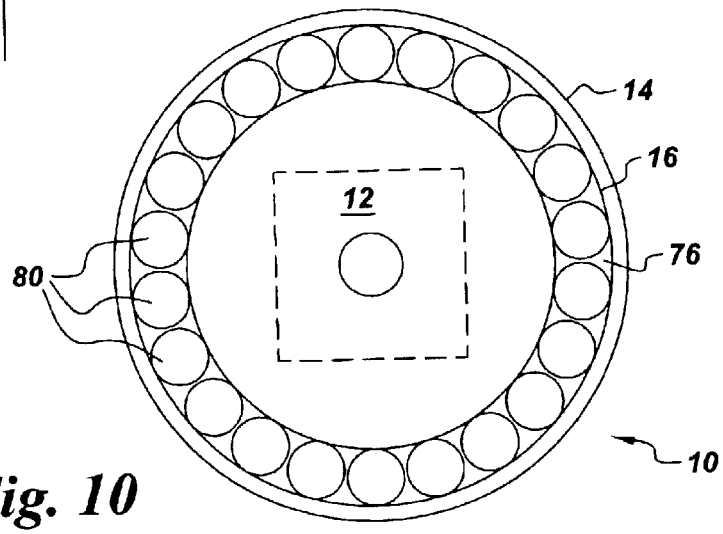
FIG. 10 is a diagrammatical elevational view of the fuel cell assembly of FIG. 9.

In another embodiment, illustrated in FIG. 9 and FIG. 10, the thermal shield 16 comprises fluid distribution manifolds 76 and 78, joined by a plurality of fluid conduits 80 configured to receive the cooling fluid thererthrough. The plurality of fluid conduits 80 receive and return circulating coolant by cooperation with passages within the fluid distribution manifolds 76 and 78. The arrangement of FIGS. 9 and 10 may permit the use of a coolant stream different from the oxidant, including a gaseous, liquid or mixed phase coolants, by isolation of the manifolds 76 and 78 from oxidant flow into and out of the fuel cell assembly 10. It should be noted, however, that the basic structure of this embodiment shares characteristics with the other embodiments described herein, such as substantially surrounding the fuel cell 12 and providing generally continuous shielding of the container wall.

Figure 11:
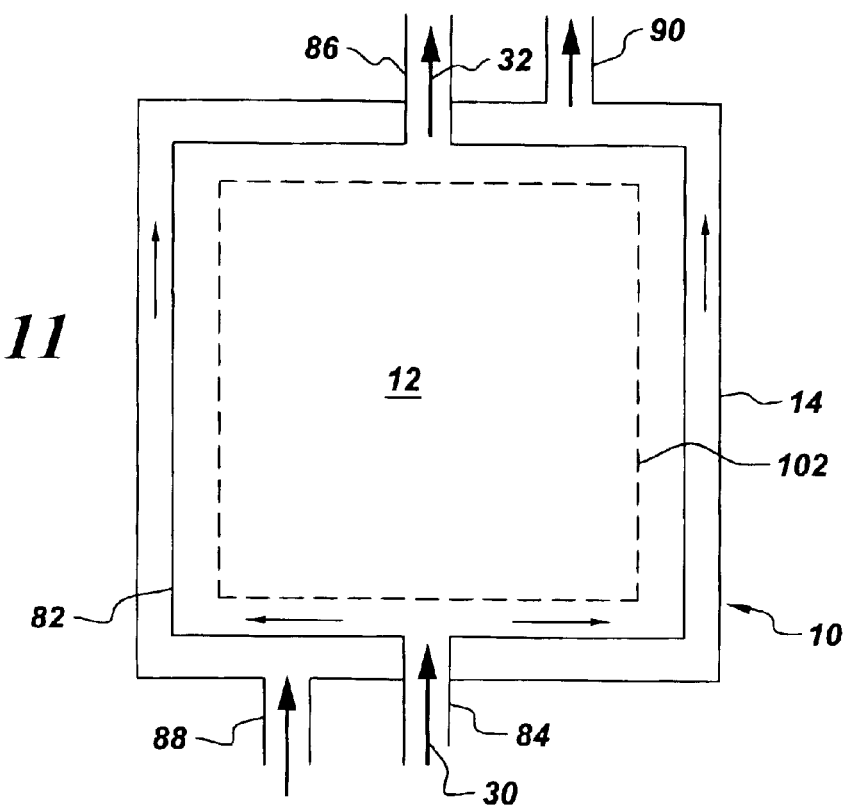
FIG. 11 is a diagrammatic view of a fuel cell assembly in accordance with a further exemplary embodiment in which coolant is separated form oxidant flowing through the fuel cell assembly.
Figure 12:
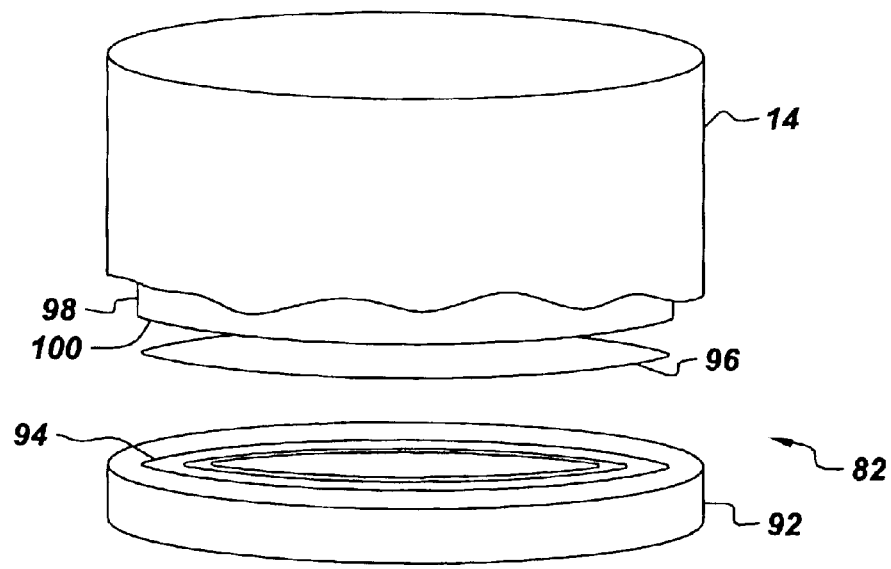
FIG. 12 is a partially broken away exploded view of a portion of the fuel cell assembly of FIG. 11.

Other embodiments may be envisaged that provide such improved thermal shielding, but sealingly isolate the coolant stream from the oxidant used by the cell. In one such embodiment, illustrated in FIG. 11 and FIG. 12, the cooling fluid enters the container 14 through a cooling fluid inlet 88. The cooling fluid is exhausted through a cooling fluid outlet 90. The oxidant 30 enters through an oxidant inlet 84 and is exhausted through an oxidant outlet 86. In such embodiments, the cooling fluid may include any suitable fluid, such as water, steam, a mixture thereof, or other fluids having desirable cooling properties (e.g. relatively high specific heat values). According to this embodiment, the thermal shield may comprise a cylindrical shield assembly 82. The cylindrical shield assembly 82 separates oxidant flow, received through inlet 84 and exhausted through outlet 86, from coolant, which is received through coolant inlet 88 and exits through coolant outlet 90. In an exemplary construction, the cylindrical shield assembly 82 further comprises a base 92 having an annular groove 94 for receiving a seal 96. The base 92 supports a lower edge 100 of the cylindrical shield 98. The seal 96 fits within an annular groove 94 and separates the cooling fluid from the oxidant. Other construction techniques may, of course, be envisaged, such as for joining the base 92 and the cylindrical shield 98 by welding, soldering, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention. For example, features may be provided on the outer surface of the thermal shield to further enhance heat transfer from the thermal shield. Thus, where the thermal shield is made of a thermally conductive material, such as a metal, fins or other features may be provided that offer greater surface areas for heat transfer, increase or orient flow of coolant over the surfaces, or increase residence time of the coolant in the structure. Similarly, such structures may be provided separately from the thermal shield itself and disposed within the coolant passage, or affixed to the thermal shield during assembly.

What is claimed is:

1. A fuel cell assembly comprising:
   a container configured to be pressurized;
   a fuel cell disposed in the container; and
   a thermal shield disposed between the container and the fuel cell and spaced from the container to form a flow path therebetween for a cooling fluid.

2. The fuel cell assembly of claim 1, wherein the fuel cell is selected from the group consisting of solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

3. The fuel cell assembly of claim 1, wherein the fuel cell comprises at least one fuel cell having planar configuration.

4. The fuel cell assembly of claim 1, wherein the fuel cell comprises at least one fuel cell having tubular configuration.

5. The fuel cell assembly of claim 1, wherein the thermal shield is configured to define an insulating layer on an inner surface of the thermal shield.

6. The fuel cell assembly of claim 5, wherein the thermal shield is configured to define another insulating layer on an inner surface of the container.

7. The fuel cell assembly of claim 6, wherein the insulating layer comprises an insulating material selected from the group consisting of ceramic oxides, cellular ceramic foam materials, and a combination thereof.

8. The fuel cell assembly of claim 1, wherein the thermal shield further comprises a second shield wall configured to define an inner surface of the container.

9. The fuel cell assembly of claim 8, wherein the insulating layer is disposed between the second shield wall and the inner surface of the container.

10. The fuel cell assembly of claim 1, wherein the thermal shield comprises a plurality of fluid conduits configured to flow the cooling fluid therethrough.

11. The fuel cell assembly of claim 10, wherein the plurality of fluid conduits further comprises at least one fluid distribution manifold configured to distribute the cooling fluid therethrough.

12. The fuel cell assembly of claim 11, wherein the cooling fluid comprises an oxidant.

13. The fuel cell assembly of claim 1, wherein the thermal shield comprises a cylindrical shield assembly.

14. The fuel cell assembly of claim 13, wherein the cylindrical shield assembly further comprisies a base and a seal configured to separate the cooling fluid from the oxidant; the base being configured to receive the seal.

15. A fuel cell assembly comprising:
   a container configured to be pressurized;
   a fuel cell disposed in the container; and
   a metallic shield disposed between the container and the fuel cell and spaced from the container to form a flow path therebetween for a cooling fluid.

16. The fuel cell assembly of claim 15, wherein the metallic shield is configured to define an insulating layer on an inner surface of the metallic shield.

17. The fuel cell assembly of claim 16, wherein the metallic shield is configured to define another insulating layer on an inner surface of the container.

18. The fuel cell assembly of claim 17, wherein the insulating layer comprises an insulating material selected from the group consisting of ceramic oxides, cellular ceramic foam materials, and a combination thereof.

19. The fuel cell assembly of claim 15, wherein the metallic shield further comprises a second shield wall configured to define an inner surface of the container.

20. The fuel cell assembly of claim 19, wherein the insulating layer is disposed between the second shield wall and the inner surface of the container.

21. The fuel cell assembly of claim 15, wherein the cooling fluid comprises an oxidant.

22. A fuel cell assembly comprising:
   a container configured to be pressurized;
   a fuel cell disposed in the container; and
   a shield substantially surrounding a perimeter of the fuel cell; the shield being disposed between the container and the fuel cell and spaced from the container to form a flow path therebetween for a cooling fluid.

23. The fuel cell assembly of claim 22, wherein the shield substantially surrounding a perimeter of the fuel cell is configured to substantially surround an inner periphery of the container to provide generally uniform thermal shielding around the fuel cell.

24. The fuel cell assembly of claim 22, wherein the shield substantially surrounding a perimeter of the fuel cell comprises a thermally conductive material.

25. The fuel cell assembly of claim 22, wherein the shield is configured to define an insulating layer on an inner surface of the shield.

26. The fuel cell assembly of claim 25, wherein the shield is configured to define another insulating layer on an inner surface of the container.

27. The fuel cell assembly of claim 26, wherein the insulating layer comprises an insulating material selected from the group consisting of ceramic oxides, cellular ceramic foam materials, and a combination thereof.

28. The fuel cell assembly of claim 22, wherein the shield further comprises a second shield wall configured to define an inner surface of the container.

29. The fuel cell assembly of claim 28, wherein the insulating layer is disposed between the second shield wall and the inner surface of the container.

30. A fuel cell assembly comprising:
   a container configured to be pressurized;
   a fuel cell disposed in the container; and
   a shield substantially surrounding an inner periphery of the container to provide generally uniform thermal shielding around the fuel cell; the shield being disposed between the container and the fuel cell and spaced from the container to form a flow path therebetween for a cooling fluid.

31. The fuel cell assembly of claim 30, wherein the shield substantially surrounding an inner periphery of the container comprises a thermally conductive material.

32. The fuel cell assembly of claim 30, wherein the shield substantially surrounding an inner periphery of the container is configured to substantially surround a perimeter of the fuel cell.

33. The fuel cell assembly of claim 30, wherein the shield is configured to define an insulating layer on an inner surface of the shield.

34. The fuel cell assembly of claim 33, wherein the shield is configured to define another insulating layer on an inner surface of the container.

35. The fuel cell assembly of claim 34, wherein the insulating layer comprises an insulating material selected from the group consisting of ceramic oxides, cellular ceramic foam materials, and a combination thereof.

36. The fuel cell assembly of claim 30, wherein the shield further comprises a second shield wall configured to define an inner surface of the container.

37. The fuel cell assembly of claim 36, wherein the insulating layer is disposed between the second shield wall and the inner surface of the container.

38. A fuel cell assembly comprising:
   a container configured to be pressurized;
   a fuel cell disposed in the container; and
   a thermally conductive shield disposed between the container and the fuel cell and spaced from the container to form a flow path therebetween for a cooling fluid.

39. The fuel cell assembly of claim 38, wherein the thermally conductive shield comprises a metallic material.

40. The fuel cell assembly of claim 38, wherein the thermally conductive shield is configured to substantially surround a perimeter of the fuel cell.

41. The fuel cell assembly of claim 38, wherein the thermally conductive shield is configured to substantially surround an inner periphery of the container to provide generally uniform thermal shielding around the fuel cell.

42. The fuel cell assembly of claim 38, wherein the thermally conductive shield is configured to define an insulating layer on an inner surface of the thermally conductive shield.

43. The fuel cell assembly of claim 42, wherein the thermally conductive shield is configured to define another insulating layer on an inner surface of the container.

44. The fuel cell assembly of claim 43, wherein the insulating layer comprises an insulating material selected from the group consisting of ceramic oxides, cellular ceramic foam materials, and a combination thereof.

45. The fuel cell assembly of claim 38, wherein the thermally conductive shield further comprises a second shield wall configured to define an inner surface of the container.

46. The fuel cell assembly of claim 45, wherein the insulating layer is disposed between the second shield wall and the inner surface of the container.

* * * * *